United States Patent
Park

(10) Patent No.: US 10,646,954 B2
(45) Date of Patent: May 12, 2020

(54) METHOD OF MANUFACTURING DISPLAY APPARATUS

(71) Applicant: Samsung Display Co., Ltd., Yongin-Si, Gyeonggi-Do (KR)

(72) Inventor: Daejin Park, Yongin-si (KR)

(73) Assignee: Samsung Display Co., Ltd. (KR)

( * ) Notice: Subject to any disclaimer, the term of this patent is extended or adjusted under 35 U.S.C. 154(b) by 350 days.

(21) Appl. No.: 15/593,794

(22) Filed: May 12, 2017

(65) Prior Publication Data

US 2017/0326682 A1 Nov. 16, 2017

(30) Foreign Application Priority Data

May 13, 2016 (KR) .................. 10-2016-0058771

(51) Int. Cl.
| | |
|---|---|
| *B23K 26/06* | (2014.01) |
| *B23K 26/57* | (2014.01) |
| *B23K 26/0622* | (2014.01) |
| *B23K 26/00* | (2014.01) |
| *B32B 38/00* | (2006.01) |
| *G02F 1/1333* | (2006.01) |

(Continued)

(52) U.S. Cl.
CPC ...... *B23K 26/0619* (2015.10); *B23K 26/0006* (2013.01); *B23K 26/0624* (2015.10); *B23K 26/57* (2015.10); *B32B 38/0004* (2013.01); *G02F 1/133305* (2013.01); *G02F 1/133351* (2013.01); *B23K 2103/172* (2018.08); *B23K 2103/42* (2018.08); *B32B 2310/0843* (2013.01); *B32B 2367/00* (2013.01); *B32B 2379/08* (2013.01); *B32B 2457/20* (2013.01)

(58) Field of Classification Search
CPC ............ B23K 26/0619; B23K 26/0006; B23K 26/0624; B23K 26/57; B23K 2103/172; B23K 2103/42; G02F 1/133351; G02F 1/133305; B32B 38/0004; B32B 2310/0843; B32B 2457/20; B32B 2367/00; B32B 2379/08
See application file for complete search history.

(56) References Cited

U.S. PATENT DOCUMENTS

| | | | |
|---|---|---|---|
| 8,520,182 B2 | 8/2013 | Lee et al. | |
| 10,137,532 B2 * | 11/2018 | Sung | ................. B23K 26/0613 |

(Continued)

FOREIGN PATENT DOCUMENTS

| | | |
|---|---|---|
| KR | 10-2010-0107252 A | 10/2010 |
| KR | 10-2011-0092062 A | 8/2011 |

(Continued)

*Primary Examiner* — Robert J Grun
(74) *Attorney, Agent, or Firm* — Innovation Counsel LLP

(57) ABSTRACT

A method of manufacturing a display apparatus includes: providing a substrate having a first surface and a second surface and arranging the substrate on a carrier such that the second surface of the substrate contacts the carrier; forming a display device on the first surface of the substrate; arranging a first protective film on the display device; cutting a substrate by irradiating a first short pulse laser beam onto the second surface of the substrate through the carrier; and cutting the first protective film by irradiating a laser beam of an infrared wavelength range onto an area of the first protective film that overlaps a cut area of the substrate.

14 Claims, 4 Drawing Sheets

(51) Int. Cl.
*B23K 103/00* (2006.01)
*B23K 103/16* (2006.01)

(56) References Cited

U.S. PATENT DOCUMENTS

2010/0243628 A1  9/2010  Lee et al.
2014/0353638 A1  12/2014  Kawata

FOREIGN PATENT DOCUMENTS

KR    10-1417924 B1    7/2014
KR    10-2014-0141480 A    12/2014

* cited by examiner

METHOD OF MANUFACTURING DISPLAY APPARATUS

CROSS-REFERENCE TO RELATED APPLICATION

This application claims the benefit of Korean Patent Application No. 10-2016-0058771, filed on May 13, 2016, in the Korean Intellectual Property Office, the disclosure of which is incorporated herein by reference in its entirety.

BACKGROUND

1. Field

The present disclosure relates to a method of manufacturing a display apparatus, and more particularly, to a method of manufacturing a display apparatus that can generate less impurities when cutting a substrate.

2. Description of the Related Art

During the manufacture of a display apparatus, a display unit is formed on a substrate and then the substrate is cut. In particular, during the manufacture of small display apparatuses, a plurality of display units is formed on a single substrate, and portions between the plurality of display units on the substrate are cut to simultaneously obtain the plurality of display apparatuses.

However, according to conventional methods of manufacturing a display apparatus, impurities can be introduced to a cutting surface of the substrate when the substrate is cut causing defects in the display apparatus.

SUMMARY

One or more embodiments of the present disclosure include a method of manufacturing a display apparatus, whereby a substrate may be cut while reducing or preventing defects that may occur in a cutting process of the substrate.

Additional aspects will be set forth in part in the description which follows and, in part, will be apparent from the description, or may be learned by practice of the presented embodiments.

According to one or more embodiments, a method of manufacturing a display apparatus includes: providing a substrate having a first surface and a second surface and arranging the substrate on a carrier such that the second surface of the substrate contacts the carrier; forming a display device on the first surface of the substrate; arranging a first protective film on the display device; cutting a substrate by irradiating a first short pulse laser beam onto the second surface of the substrate through the carrier; and cutting the first protective film by irradiating a laser beam of an infrared wavelength range onto an area of the first protective film that overlaps a cut area of the substrate.

According to one or more embodiments, the first short pulse laser beam is a femtosecond laser beam or a picosecond laser beam.

According to one or more embodiments, the laser beam of the infrared wavelength range is a carbon dioxide laser beam.

According to one or more embodiments, the method may further include separating the carrier from the substrate; arranging a second protective film on the substrate such that the second surface of the substrate contacts the second protective film, and cutting the second protective film by irradiating a second short pulse laser beam onto an area of the second protective film that overlaps the cut area of the substrate.

According to one or more embodiments, the cutting of the first protective film may be performed after arranging the second protective film on the substrate.

According to one or more embodiments, the cutting of the second protective film may be performed after the cutting of the first protective film.

According to one or more embodiments, the cutting of the second protective film may include cutting the second protective film by irradiating a femtosecond laser beam or a picosecond laser beam.

According to one or more embodiments, the cutting of the second protective film may include cutting the second protective film by irradiating the first short pulse laser beam used for cutting the substrate.

According to one or more embodiments, the carrier may include a light-transmissive material.

According to one or more embodiments, the carrier may include a glass material.

According to one or more embodiments, the substrate may include polyimide.

According to one or more embodiments, the first protective film may include polyethyleneterephthalate.

According to one or more embodiments, the second protective film may include polyethyleneterephthalate.

According to one or more embodiments, the forming of the display device may include forming the display device on a plurality of display areas of the substrate, and the cutting of the substrate may include cutting the substrate by irradiating the first short pulse laser beam onto portions between the plurality of display areas of the substrate.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
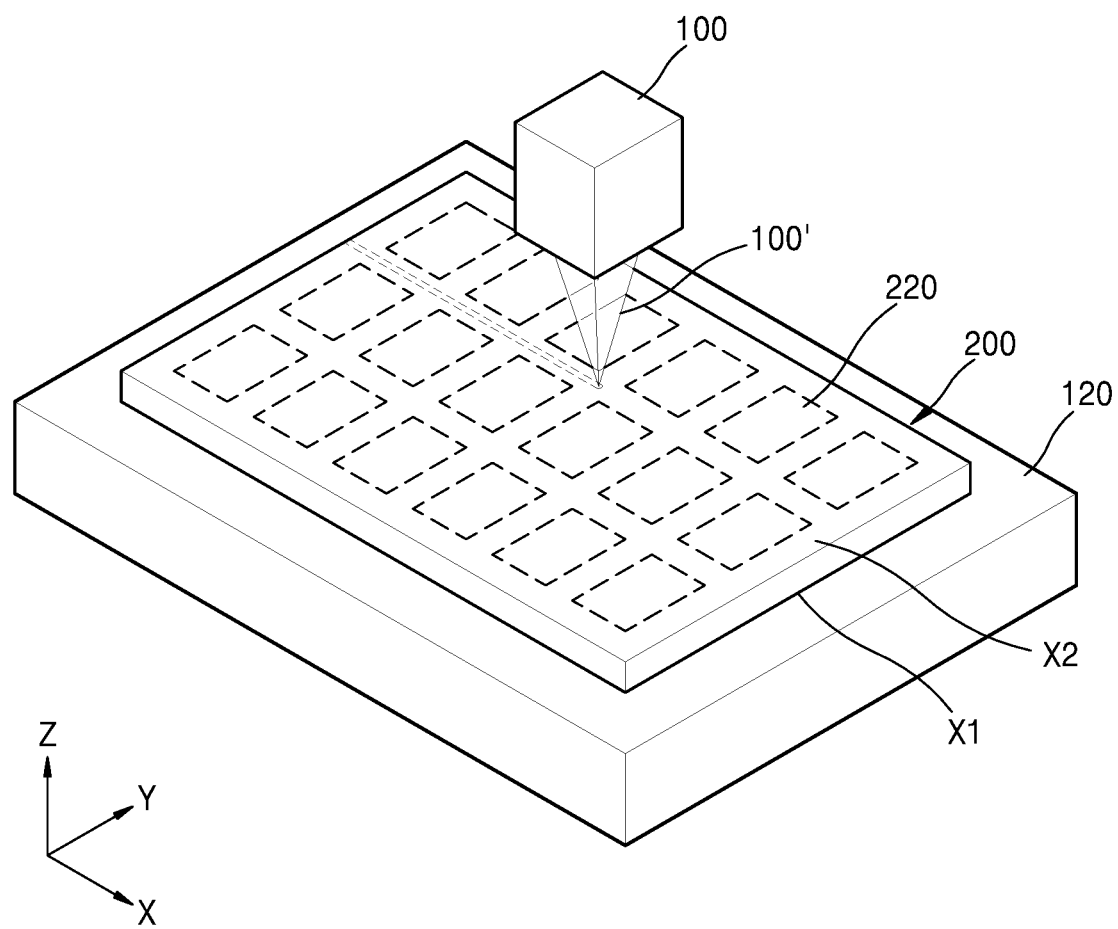
FIGS. 1 and 2 are perspective views for describing a process of cutting a substrate by using a method of manufacturing a display apparatus, according to one embodiment.

As the present disclosure allows for various changes and numerous embodiments, particular embodiments will be illustrated in the drawings and described in detail in the written description. However, this is not intended to limit the present disclosure to particular modes of practice, and it is to be appreciated that various changes, equivalents, and substitutes are encompassed in the present disclosure without departing from the spirit and technical scope of the present disclosure. In the description of the present disclosure, certain detailed explanations of related art may be omitted when it is deemed that they may unnecessarily obscure the essence of the present disclosure.

It will be understood that although the terms "first," "second," etc. may be used herein to describe various components, these components should not be limited by these terms. These components are only used to distinguish one component from another.

In the following examples, the x-axis, the y-axis and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

Reference will now be made in detail to embodiments, examples of which are illustrated n the accompanying drawings. In the drawings, the same elements are denoted by the same reference numerals, and a repeated explanation thereof may not be given. Sizes of elements in the drawings may be exaggerated for convenience of explanation. In other words, since sizes and thicknesses of components in the drawings may be arbitrarily illustrated for convenience of explanation, the following embodiments are not limited thereto.

As used herein, the term "and/or" includes any and all combinations of one or more of the associated listed items. Expressions such as "at least one of," when preceding a list of elements, may modify the entire list of elements and may not modify the individual elements of the list.

Figure 2:
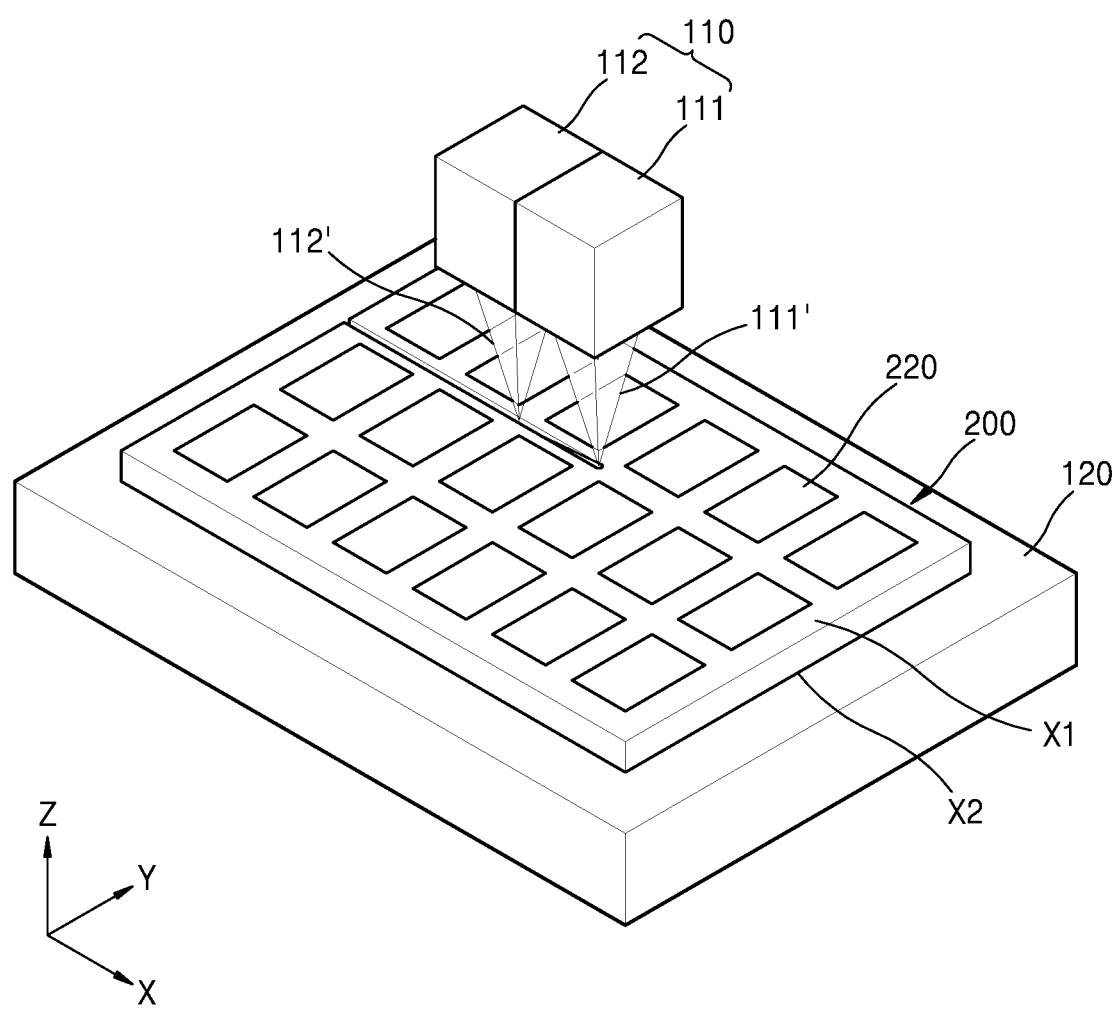

FIGS. 1 and 2 are perspective views for describing a process of cutting a substrate 200 by using a method of manufacturing a display apparatus, according to one embodiment.

As illustrated in FIGS. 1 and 2, a display unit 220 is formed by forming a display device on a first surface X1 of the substrate 200, and the substrate 200 is cut by irradiating a laser beam onto the substrate 200. The cutting process of the substrate 200 includes sequentially irradiating a plurality of laser beams having different wavelengths onto one or more surfaces of the substrate 200. For example, the substrate 200 is cut by irradiating a first short pulse laser beam 100' onto a second surface X2 of the substrate 200, irradiating a laser beam 111' of an infrared wavelength range onto an area of the substrate 200, onto which the first short pulse laser beam 100' is irradiated, and irradiating a second short pulse laser beam 112' onto the area of the substrate 200, onto which the laser beam 111' of the infrared wavelength range is irradiated. Hereinafter, the process of cutting the substrate 200 will be described in more detail.

First, as illustrated in FIG. 1, at least a portion of the substrate 200 is cut by irradiating the first short pulse laser beam 100' onto the second surface X2 of the substrate 200. The second surface X2 of the substrate 200 denotes a surface that is opposite to the first surface X1 of the substrate 200 on which the display unit 220 is formed.

According to one embodiment, the substrate 200 may be arranged on a stage 120 for the process of cutting. A plurality of display units 220 may be formed on the substrate 200. The display units 220 may include various types of display units, such as organic light-emitting display units and liquid crystal display units. Although it is not illustrated in FIG. 1 and other drawings, the substrate 200 may be fixed on the stage 120 by using a fixing mechanism such as a clamp (not shown) to prevent the movement of the substrate 200 during the cutting process.

A first short pulse laser beam emitter 100 may irradiate the first short pulse laser beam 100' onto the second surface X2 of the substrate 200. For example, the first short pulse laser beam emitter 100 may include a femtosecond laser beam emitter that may emit a laser beam of pulses of 750 fs and a wavelength of about 1030 nm, or a picosecond laser beam emitter that may emit a laser beam of pulses of 10 ps and a wavelength of about 515 nm.

Although it is not illustrated in FIGS. 1 and 2, a carrier (not shown) may be arranged on the second surface X2 of the substrate 200. The substrate 200 may be a flexible substrate. For example, the substrate 200 may include polyimide (PI). When the carrier is arranged on the second surface X2 of the substrate 200, the first short pulse laser beam 100' may not be directly irradiated onto the second surface X2 of the substrate 200 but instead may be indirectly irradiated onto the second surface X2 of the substrate 200 through the carrier. The carrier may include a transparent material, so that the first short pulse laser beam 100' may be transmitted through the carrier. For example, the carrier may include a transparent glass material that can solidly support the flexible substrate 200.

According to one embodiment, the substrate 200 may have a multi-layered structure including different materials rather than a single layer including a single material. In this case, the first short pulse laser beam 100' may be irradiated onto a layer of the multi-layered structure of the substrate 200 to cut the layer. The first short pulse laser beam 100' has short pulses and is irradiated at a relatively high intensity for a short period of time, for example, in the order of femtoseconds or picoseconds. The short irradiation of the relatively high intensity laser beam can selectively cut a layer of the substrate 200 while minimizing heat strains that may be generated around the area onto which the first short pulse laser beam 100' is irradiated.

Meanwhile, at least one of the first short pulse laser beam emitter 100 and the stage 120 may move in a direction. For example, in the case illustrated in FIG. 1, the stage 120 may move in a direction −X, while the first short pulse laser beam emitter 100 is fixed in space. However, the stage 120 may move not only in the direction −X, but also in directions +X, −Y, and/or +Y, and may rotate about an axis +Z or −Z.

Alternatively, while the stage 120 is fixed, the first short pulse laser beam emitter 100 may move in the direction +X. The first short pulse laser beam emitter 100 may move not only in the direction +X, but also in the directions −X, +Y, and/or −Y, and may rotate about the axis +Z or −Z.

It is noted that various movements and/or rotations of the first short pulse laser beam emitter 100 and/or the stage 120 are possible during the cutting process. For example, the stage 120 may move in the direction −X, while the first short pulse laser beam emitter 100 moves in the direction +X.

These movements and/or rotations of the laser beam emitter and the stage are likewise applicable to embodiments and modified embodiments to be described later.

As illustrated in FIG. 2, an integrated laser beam emitter 110 includes an emitter 111 and a second short pulse laser beam emitter 112. The emitter 111 irradiates the laser beam 111' of the infrared wavelength range onto the area of the substrate 200, onto which the first short pulse laser beam 100' is irradiated, and subsequently the second short pulse laser beam emitter 112 irradiates the second short pulse laser beam 112' onto the area of the substrate 200, onto which the laser beam 111' of the infrared wavelength range is irradiated, to cut the entire substrate 200. The substrate 200 is turned over from the arrangement shown in FIG. 1 so that the first surface X1 of the substrate 200 is exposed to the irradiation of the laser beam of the infrared wavelength range and/or the second short pulse laser beam 112'. However, the present disclosure is not limited thereto. It is possible to cut the substrate 200 by irradiating the laser beam 111' of the infrared wavelength range and the second short pulse laser beam 112' onto the second surface X2 of the substrate 200.

FIG. 2 illustrates that the substrate 200 is cut by using the integrated laser beam emitter 110 including the emitter 111 of the laser beam of the infrared wavelength range and the second short pulse laser beam emitter 112 that are arranged adjacent to each other. The emitter 111 of the laser beam of the infrared wavelength range and the second short pulse laser beam emitter 112 may contact each other, or may be spaced apart by a distance from but adjacent to each other.

When the integrated laser beam emitter 110 is used, the laser beam 111' of the infrared wavelength range emitted from the emitter 111 of the laser beam of the infrared wavelength range may first be irradiated onto the substrate 200, and after a predetermined interval, the short pulse laser beam 112' emitted from the second short pulse laser beam emitter 112 may be irradiated onto the area of the substrate 200, onto which the laser beam 111' of the infrared wavelength range is irradiated. In this case, the time interval between the irradiation of the laser beam 111' of the infrared wavelength range and the irradiation of the second short pulse laser beam 112' may correspond to a time that is taken by the second short pulse laser beam 112' to move the distance between the laser beam 111' of the infrared wavelength range and the second short pulse laser beam 112'. As such, the subsequent irradiation of the laser beam 111' of the infrared wavelength range and the second short pulse laser beam 112' may be performed as a single irradiation process to improve a manufacturing yield of the display apparatus. In addition, when the integrated laser beam emitter 110 is used, the substrate having the multi-layered structure may be efficiently and precisely cut. For example, one layer of the multi-layered structure of the substrate may be cut using the laser beam 111' emitted from the emitter 111 of the laser beam of the infrared wavelength range, and another layer may be cut using the laser beam 112' emitted from the second short pulse laser beam emitter 112.

However, the present disclosure is not limited thereto, and the irradiation of the laser beam 111' of the infrared wavelength range and the irradiation of the second short pulse laser beam 112' may be performed as two distinct processes. That is, the emitter 111 of the laser beam of the infrared wavelength range may first irradiate the laser beam 111' of the infrared wavelength range onto the surface of the substrate 200, and subsequently the second short pulse laser beam emitter 112 may irradiate the second short pulse laser beam 112' onto the path, onto which the laser beam 111' of the infrared wavelength range is irradiated. In this case, the emitter 111 of the laser beam of the infrared wavelength range and the second short pulse laser beam emitter 112 may move and/or rotate independently from each other. The time interval of the irradiation of the laser beam 111' and the second short pulse laser beam 112' may vary depending on the location on the substrate 200.

The emitter 111 of the laser beam of the infrared wavelength may include a carbon dioxide laser beam emitter that may emit a laser beam of pulses of about 15 μs and a wavelength of about 9 μm through about 10 μm. The second short pulse laser beam emitter 112 may include a femtosecond laser beam emitter that may emit a laser beam of pulses of 750 fs and a wavelength of about 1030 nm, or a picosecond laser beam emitter that may emit a laser beam of pulses of 10 ps and a wavelength of about 515 nm. The first short pulse laser beam emitter 100 may be reused as the second short pulse laser beam emitter 112 to reduce the number of laser beam emitters and decrease the manufacturing cost.

As described above, the substrate 200 is cut by irradiating the laser beams onto the portions between the plurality of display areas of the substrate 200.

Figure 3:
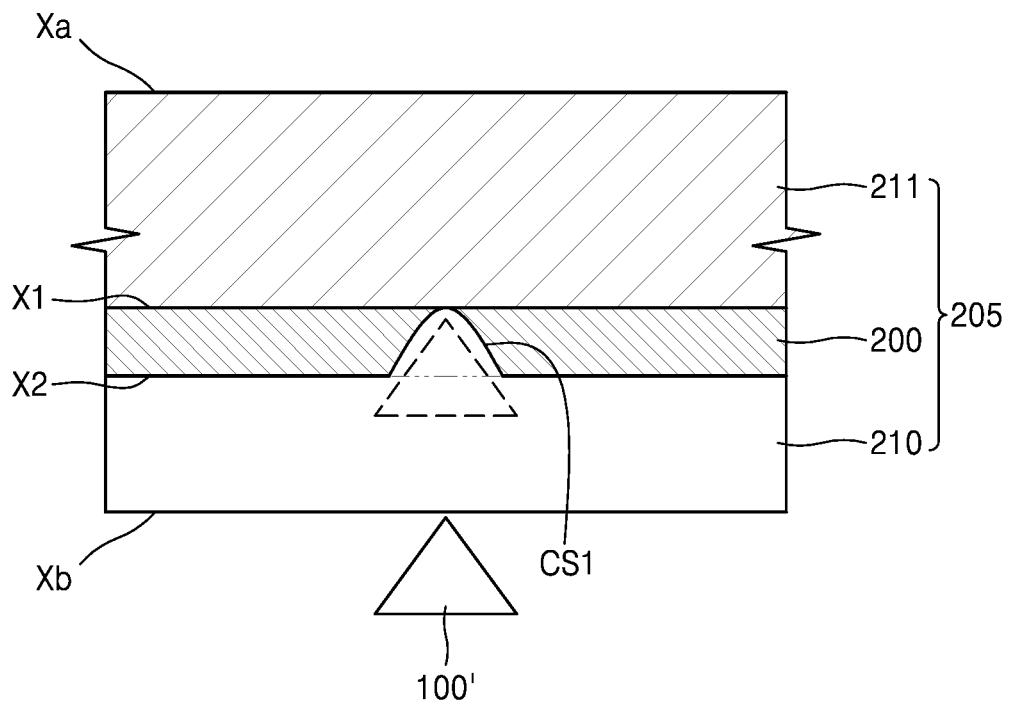
FIGS. 3 through 5 are cross-sectional views for describing a process of cutting a substrate by using a method of manufacturing a display apparatus, according to another embodiment.
Figure 4:
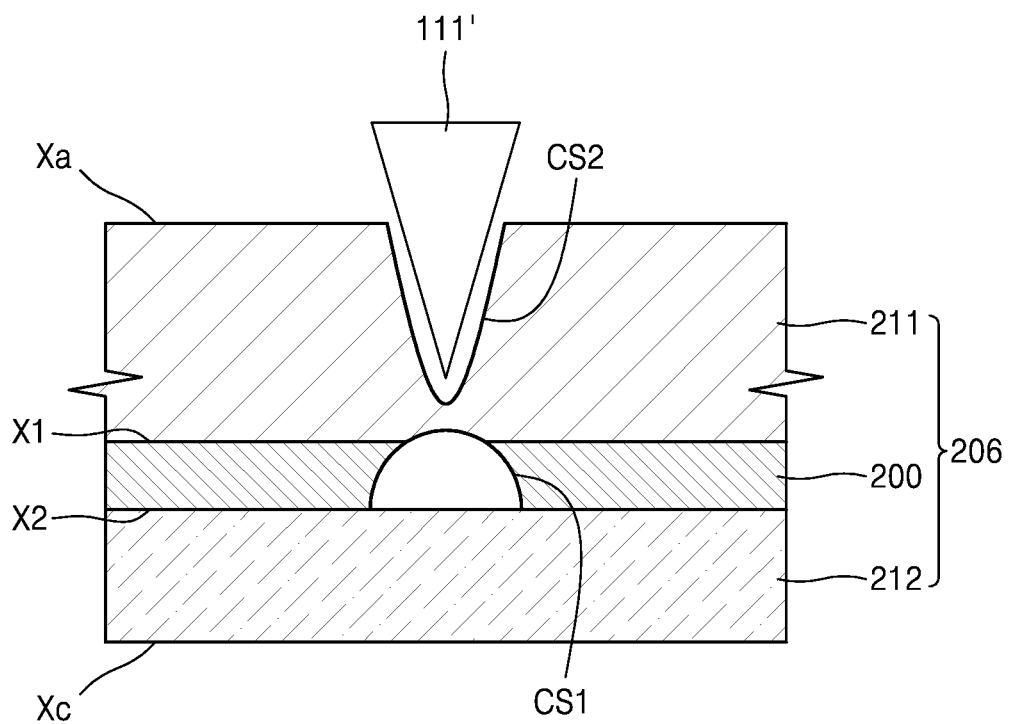
Figure 5:
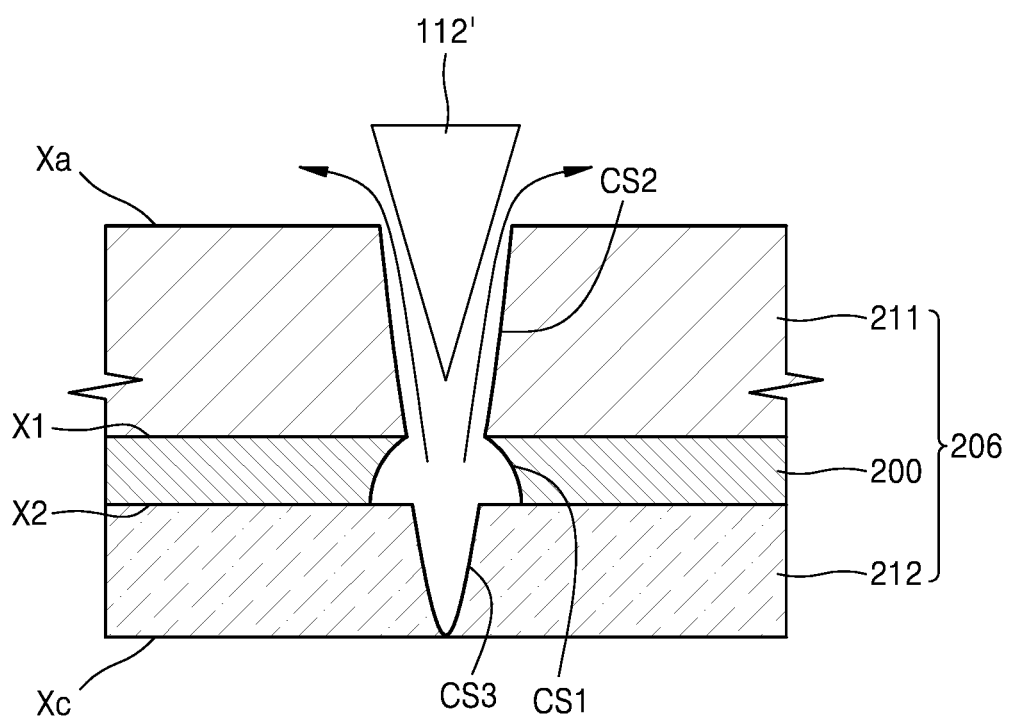

FIGS. 3 through 5 are cross-sectional views for describing a process of cutting the substrate 200 by using a method of manufacturing a display apparatus according to another embodiment.

One or more layers having different materials from the substrate 200 may be arranged on the first surface X1 and the second surface X2 of the substrate 200. In the example shown in FIG. 3, a first substrate stack 205 includes a carrier 210 arranged on the second surface X2 of the substrate 200, and a first protective film 211 arranged on the first surface X1 of the substrate 200. In the example shown in FIG. 4, a second substrate stack 206 includes a second protective film 212 arranged on the second surface X2 of the substrate 200, and a first protective film 211 arranged on the first surface X1 of the substrate 200. Compared to the case of FIG. 1, the first short pulse laser beam 100' is first irradiated on a lower surface Xb of the carrier 210, rather than the first surface X1 of the substrate 200. In addition, compared to the case of FIG. 2, the laser beam 111' of the infrared wavelength range and the second short pulse laser beam 112' are irradiated on an upper surface Xa of the first protective film 211 or a lower surface Xc of the second protective film 212.

Referring to FIG. 3, the carrier 210 is arranged on the second surface X2 of the substrate 200. In detail, the second surface X2 of the substrate 200 may contact a first surface of the carrier 210. The carrier 210 may have a transparent material. For example, the carrier 210 may include a glass material. In addition, the substrate 200 may be a flexible substrate. For example, the substrate 200 may be a substrate including polyimide.

A display device (not shown) may be formed on the first surface X1 of the substrate 200. The substrate 200 may include a plurality of display areas, on each of which a display device is formed. The display devices may include, for example, organic light-emitting display devices, liquid-crystal display devices, etc.

Thereafter, the first protective film 211 may be arranged on the display device. The first protective film 211 may prevent the display device, other layers, and devices formed on the substrate 200 from being damaged during subsequent processes, such as cutting. According to one embodiment, the first protective film 211 may entirely cover the plurality of display areas. The first protective film 211 may have a multi-layered structure including a polymer material. For example, the first protective film 211 may include a layer including polyethyleneterephthalate and an adhesive layer (not shown) coated on a surface of the layer that adheres the first protective film 211 to the adhesive layer. The adhesive layer may be a layer coated with a pressure sensitive adhesive (PSA). As such, the first substrate stack 205 includes the carrier 210, the substrate 200, and the first protective film 211 that are sequentially stacked, as illustrated in FIG. 3.

Thereafter, the first short pulse laser beam 100' is irradiated onto the second surface X2 of the substrate 200 of the first substrate stack 205. In the example shown in FIG. 3, the first short pulse laser beam 100' is irradiated onto the lower surface Xb of the carrier 210 to indirectly irradiate the first short pulse laser beam 100' to the second surface X2 of the substrate 200. By doing so, the first short pulse laser beam 100' penetrates the carrier 210 and is irradiated onto the second surface X2 of the substrate 200 to selectively cut the substrate 200 from the first substrate stack 205. The first short pulse laser beam 100' has short pulses and is irradiated at a relatively high intensity for a short period of time. The short irradiation of the relatively high intensity laser beam can minimize heat strains around the areas of the carrier 210 onto which the first short pulse laser beam 100' is irradiated. For example, the first short pulse laser beam 100' may be a femtosecond laser beam of pulses of 750 fs and a wavelength of about 1030 nm, or a picosecond laser beam of pulses of 10 ps and a wavelength of about 515 nm.

According to one embodiment, the present cutting process is advantageous when the substrate 200 including PI is cut. If the substrate 200 is cut by a conventional cutting process, for example, by irradiating a carbon dioxide laser beam having a relatively high power, rather than by irradiating the femtosecond or the picosecond laser beam, a large amount of ash can be generated contaminating a cutting surface of the substrate 200. Further, the ash may adhere to a pad unit to cause a burnt defect, etc. In addition, the carbon dioxide laser beam has a large variation of power along a distance to an irradiated surface, and thus, when the carbon dioxide laser beam is irradiated onto the substrate 200, there is a limit in the distance of the carbon dioxide laser beam from the irradiated surface of the substrate 200 to prevent extensive thermal damage or ash generation in the PI layer of the substrate 200. In the present example, the substrate 200 including PI may be cut by irradiating the femtosecond or the picosecond laser beam, such as the first short pulse laser beam 100', to prevent contamination and/or defects that may occur due to the generation of ash when the carbon dioxide laser beam is irradiated to cut the substrate 200.

Referring to FIG. 3, the first short pulse laser beam 100' is irradiated in a direction toward the first protective film 211, and a first cutting surface CS1 is formed on the substrate 200. The first cutting surface CS1 may have a shape that is dent toward the direction of the first protective film 211. Thus, a cutting width of the first surface X1 may be smaller than a cutting width of the second surface X2. The first short pulse laser beam 100' is indirectly irradiated onto the substrate 200 through the carrier 210, and thus, even if the first short pulse laser beam 100' is a femtosecond or a picosecond laser beam, an inclination angle of the cut surface of the substrate 200 may be less compared to a case in which the first short pulse laser beam 100' is directly irradiated onto the substrate 200.

Thereafter, the carrier 210 may be separated from the substrate 200, and the second protective film 212 may be arranged on the second surface X2 of the substrate 200, as illustrated in FIG. 4. In detail, the second protective film 212 may be arranged on the substrate 200 such that the second surface X2 of the substrate 200 contacts the second protective film 212. The second protective film 212 may prevent the second surface X2 of the substrate 200 including a flexible material from being damaged in a subsequent cutting process. The second protective film 212 may have a multi-layered structure including a polymer material similar to the first protective film 211. For example, the second protective film 212 may include a layer including polyethyleneterephthalate and an adhesive layer (not shown) coated on a surface of the layer that adheres the second protective film 212 to the adhesive layer. The adhesive layer may be a layer coated with a PSA. As such, the second substrate stack 206 includes the second protective film 212, the substrate 200, and the first protective film 211 that are sequentially stacked, as illustrated in FIG. 4. At this stage, the substrate 200 may be cut by the first short pulse laser beam 100' having the first cutting surface CS1.

Thereafter, the first protective film 211 is cut by irradiating the laser beam 111' of the infrared wavelength range onto the first protective film 211. FIG. 4 illustrates that the first protective film 211 is cut by using the laser beam 111' of the infrared wavelength range. However, the second protective film 212 may be cut by irradiating the laser beam 111' of the infrared wavelength range onto the second protective film 212 before the first protective film 211 is cut. Hereinafter, for convenience of explanation, it will be described in detail by focusing on the case in which the laser beam 111' of the infrared wavelength range is irradiated onto the first protective film 211.

The laser beam 111' of the infrared wavelength range may be a carbon dioxide laser beam of pulses of about 15 μs and a wavelength of about 9 μm through about 10 μm.

As described above, the carbon dioxide laser beam may be a laser beam having a relatively high power and may be used for a cutting operation that requires a relatively high energy. Thus, the carbon dioxide laser beam may easily cut the first protective film 211 that is relatively thick to protect the display device formed on the substrate 200.

The laser beam 111' of the infrared wavelength range is irradiated in a direction toward the second protective film 212 to form a second cutting surface CS2 on the first protective film 211. The second cutting surface CS2 may have a shape that is dent toward the second protective film 212. Thus, a cutting width of the surface Xa of the first protective film 211 may be greater than a cutting width of the first protective film 211 toward the first surface X1 of the substrate 200. The first protective film 211 of the second substrate stack 206 may be partially cut, and the remaining portion of the first protective film 211 may be cut using the second short pulse laser beam 112' in the next cutting process.

Thereafter, as shown in FIG. 5, the second protective film 212 may be cut by irradiating the second short pulse laser beam 112' onto the second protective film 212. By doing so, the second substrate stack 206 including the second protective film 212, the substrate 200, and the first protective film 211 that are sequentially stacked is completely cut. FIG. 5 illustrates that the second protective film 212 is cut by using the second short pulse laser beam 112'. However, when the second protective film 212 is cut first, the second short pulse laser beam 112' may be irradiated from an opposite side onto the first protective film 211 to complete the cutting of the second substrate stack 206.

The second short pulse laser beam 112' may be a femtosecond laser beam of pulses of about 750 fs and a wavelength of about 1030 nm, or a picosecond laser beam of pulses of about 10 ps and a wavelength of about 515 nm. As described above, the femtosecond or the picosecond laser beam is irradiated at a relatively high intensity for a short period of time to minimize heat strains around an area onto which the laser beam is irradiated. Accordingly, when the femtosecond or the picosecond laser beam is used for the last cutting process, heat strains on or near the cutting surfaces irradiated with the first short pulse laser beam 100' and the carbon dioxide laser beam 111' can be minimized.

The second short pulse laser beam 112' is irradiated in the direction toward the second protective film 212 similar to the laser beam 111' of the infrared wavelength range to form a third cutting surface CS3. on the second protective film 212. The third cutting surface CS3 may have a shape that is dent toward the lower surface Xc of the second protective film 212. Thus, a cutting width of a surface of the second protective film 212 toward the second surface X2 of the substrate 200 may be greater than a cutting width of the lower surface Xc of the second protective film 212.

As described above, according to the one or more of the above embodiments, the method of manufacturing the display apparatus may include precisely cutting the substrate while suppressing defects when cutting the substrate, thereby effectively cutting the substrate and improving a manufacturing yield of the display apparatus.

It should be understood that the embodiments of the present disclosure described herein should be considered in a descriptive sense only and not for purposes of limitation. Descriptions of features or aspects within each embodiment should typically be considered as available for other similar features or aspects in other embodiments.

While one or more embodiments have been described with reference to the drawings, it will be understood by those of ordinary skill in the art that various changes in form and details may be made therein without departing from the spirit and scope as defined by the following claims.

What is claimed is:

1. A method of manufacturing a display apparatus, the method comprising:
    providing a substrate having a first surface and a second surface and arranging the substrate on a carrier such that the second surface of the substrate contacts the carrier;
    forming a display device on the first surface of the substrate;
    arranging a first protective film on the display device;
    cutting the substrate by irradiating a first short pulse laser beam onto the second surface of the substrate through the carrier; and
    cutting the first protective film by irradiating a laser beam of an infrared wavelength range onto an area of the first protective film that overlaps a cut area of the substrate.

2. The method of claim 1, wherein the first short pulse laser beam is a femtosecond laser beam or a picosecond laser beam.

3. The method of claim 1, wherein the laser beam of the infrared wavelength range is a carbon dioxide laser beam.

4. The method of claim 1, further comprising:
    separating the carrier from the substrate;
    arranging a second protective film on the substrate such that the second surface of the substrate contacts the second protective film; and
    cutting the second protective film by irradiating a second short pulse laser beam onto an area of the second protective film that overlaps the cut area of the substrate.

5. The method of claim 4, wherein the cutting of the first protective film is performed after arranging the second protective film on the substrate.

6. The method of claim 4, wherein the cutting of the second protective film is performed after the cutting of the first protective film.

7. The method of claim 4, wherein the cutting of the second protective film comprises cutting the second protective film by irradiating a femtosecond laser beam or a picosecond laser beam.

8. The method of claim 4, wherein the cutting of the second protective film comprises cutting the second protective film by irradiating the first short pulse laser beam used for cutting the substrate.

9. The method of claim 4, wherein the second protective film comprises polyethyleneterephthalate.

10. The method of claim 1, wherein the carrier comprises a light-transmissive material.

11. The method of claim 1, wherein the carrier comprises a glass material.

12. The method of claim 1, wherein the substrate comprises polyimide.

13. The method of claim 1, wherein the first protective film comprises polyethyleneterephthalate.

14. The method of claim 1, wherein the forming of the display device comprises forming the display device on a plurality of display areas of the substrate, and
    the cutting of the substrate comprises cutting the substrate by irradiating the first short pulse laser beam onto portions between the plurality of display areas of the substrate.

* * * * *